(12) United States Patent
Sortino et al.

(10) Patent No.: US 9,926,954 B2
(45) Date of Patent: Mar. 27, 2018

(54) COLLAPSIBLE AND PORTABLE WINE NOOK

(71) Applicant: Cooper's Hawk Intermediate Holdings LLC, Countryside, IL (US)

(72) Inventors: Dee Sortino, Countryside, IL (US); Eric Larson, Countryside, IL (US)

(73) Assignee: Cooper's Hawk Intermediate Holding, LLC, Countryside, IL (US)

( * ) Notice: Subject to any disclaimer, the term of this patent is extended or adjusted under 35 U.S.C. 154(b) by 0 days.

(21) Appl. No.: 15/275,440

(22) Filed: Sep. 25, 2016

(65) Prior Publication Data
US 2017/0086603 A1   Mar. 30, 2017

Related U.S. Application Data

(60) Provisional application No. 62/232,909, filed on Sep. 25, 2015.

(51) Int. Cl.
*F16B 1/00* (2006.01)
*A47G 23/02* (2006.01)

(52) U.S. Cl.
CPC ............... *F16B 1/00* (2013.01); *A47G 23/02* (2013.01); *F16B 2001/0028* (2013.01); *F16B 2001/0035* (2013.01)

(58) Field of Classification Search
CPC .............. A47F 5/108; A47F 7/0071; A47F 2001/0035; A47F 2001/0028; A47G 23/0641; A47G 23/02; F16B 1/00; F16B 2001/0035; F16B 2001/0028
See application file for complete search history.

(56) References Cited

U.S. PATENT DOCUMENTS

| 1,546,192 | A | * | 7/1925 | Berg | E04H 15/32 135/114 |
|---|---|---|---|---|---|
| 2,122,042 | A | * | 6/1938 | Mattucci | A47B 69/00 312/140.2 |
| 2,967,037 | A | * | 1/1961 | Christle | A47B 3/02 108/145 |
| 3,000,683 | A | * | 9/1961 | MacNeary | A47B 21/02 108/106 |
| 4,337,709 | A | * | 7/1982 | Nicholson | A47B 13/08 108/33 |
| 4,947,991 | A | * | 8/1990 | Snell | A47G 23/0641 206/427 |
| 6,135,296 | A | * | 10/2000 | Colgrove | A47L 15/505 211/41.8 |
| 7,461,822 | B2 | * | 12/2008 | Edwards | A01M 31/02 108/97 |
| 7,562,785 | B2 | * | 7/2009 | Meissen | B65D 81/36 220/4.28 |
| 7,765,941 | B2 | * | 8/2010 | Chen | A47B 3/083 108/159.11 |

(Continued)

*Primary Examiner* — Ko H Chan
(74) *Attorney, Agent, or Firm* — Kevin J. Lahey, Esq.

(57) ABSTRACT

This invention is an apparatus that enables one to easily transport and set up on-the-go wine and snack tasting, allowing for stylish, tasting-room entertaining at any desired location. The invention is a miniature, bi-level table with collapsible, locking legs, side handles, notches for wine glasses, circular opening(s) for holding bottle(s) of wine, an appetizer tray/platter with defined sections for organizing and serving cheeses, snacks, and desserts, and a magnetic underside to hold a wine key in place for safekeeping.

7 Claims, 6 Drawing Sheets

(56) References Cited

U.S. PATENT DOCUMENTS

2003/0188673 A1* 10/2003 Block ................... A47B 37/04
                                                        108/150
2016/0374483 A1* 12/2016 Maldonado ............... A47F 7/06
                                                        312/122

* cited by examiner

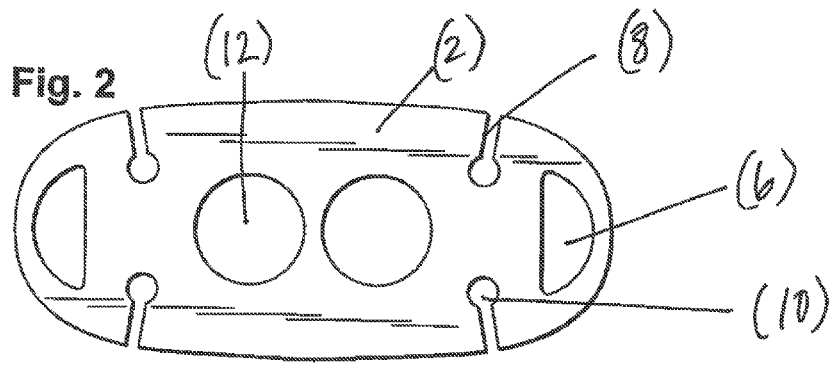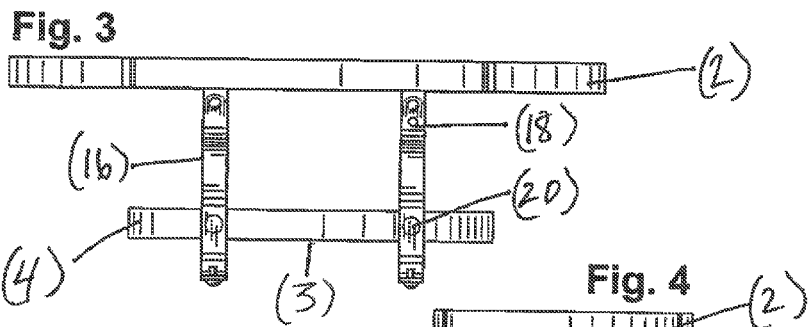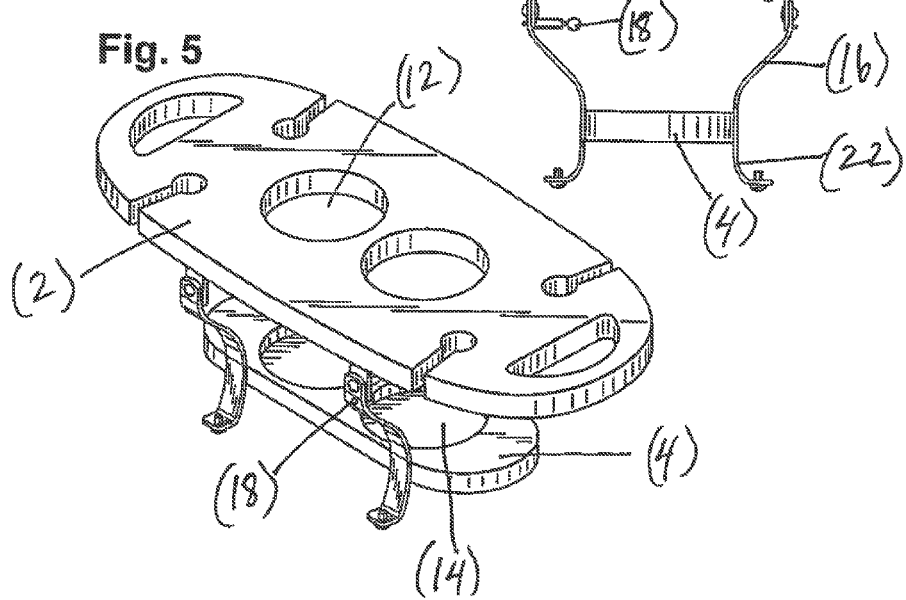

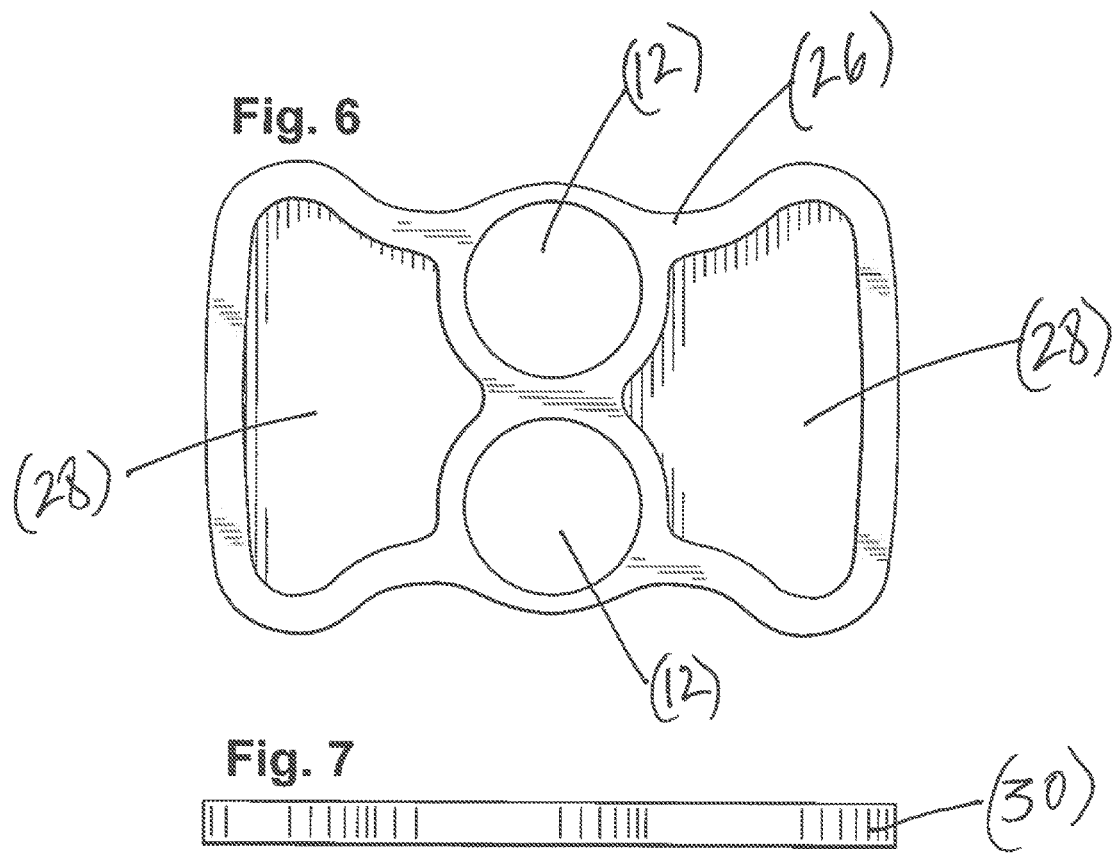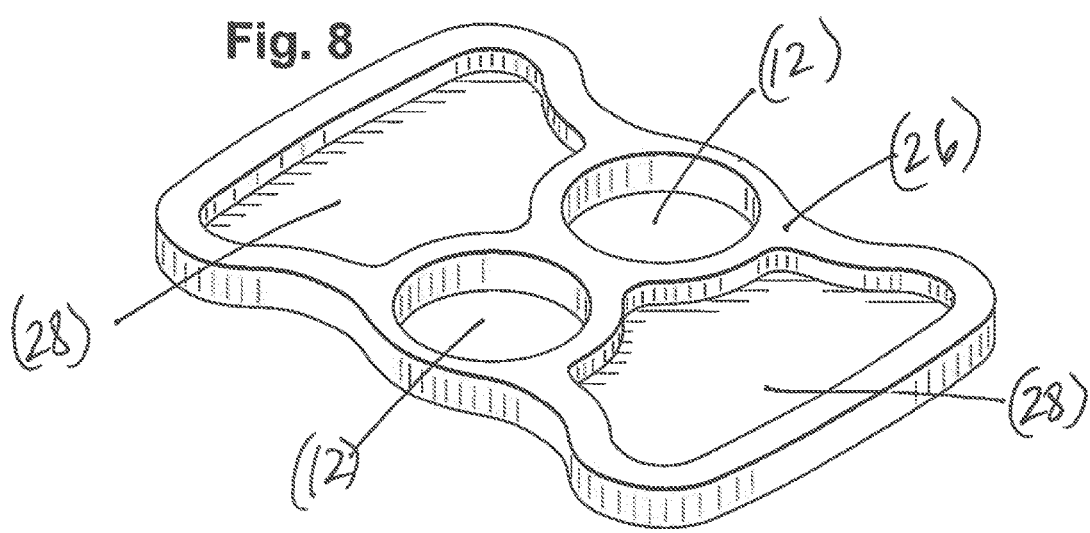

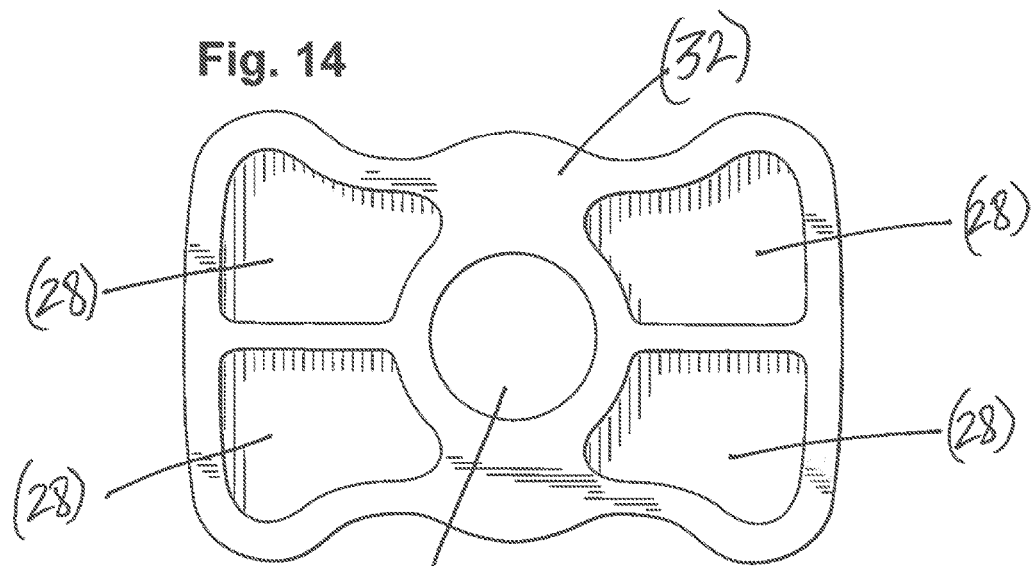
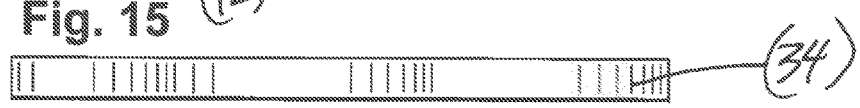
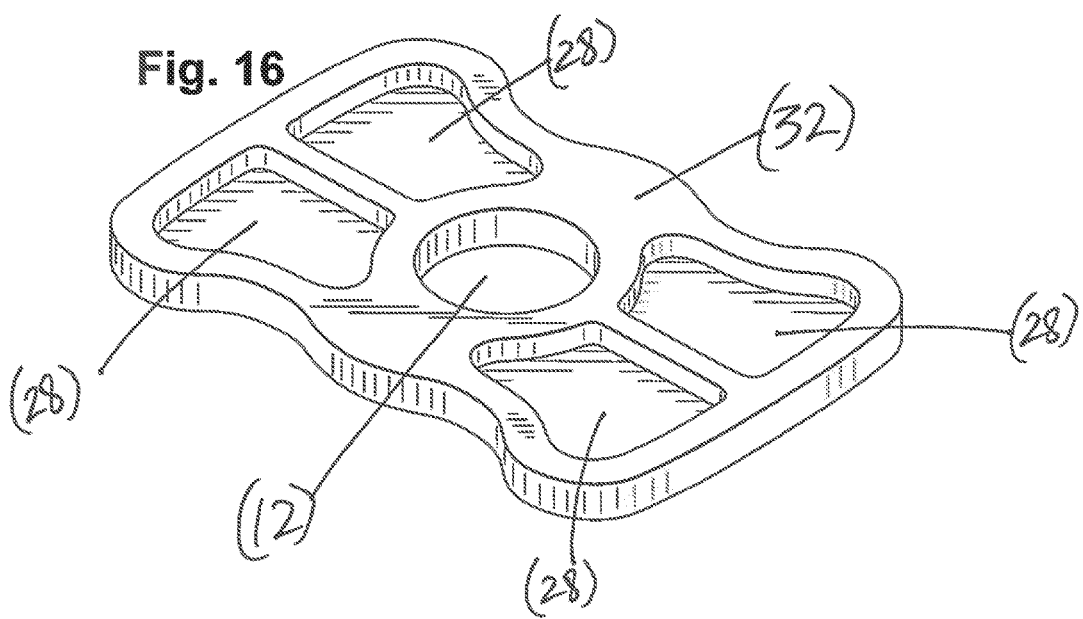

COLLAPSIBLE AND PORTABLE WINE NOOK

CROSS-REFERENCE TO RELATED APPLICATIONS

This Application claims priority to previously-filed U.S. Provisional Utility Application No. 62/232,909, filed on 25 Sep. 2015 entitled Collapsible and Portable Wine Nook.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LIST COMPACT DISC APPENDIX

Not applicable.

BACKGROUND OF THE INVENTION

Wine drinkers, whether avid or casual, have become accustomed to frequenting wine shops, restaurants, retail outlets, and tasting rooms that allow for the enjoyment of their favorite wine with various snacks, such as fruits, cheeses, and breads. The instant availability of these foods while tasting and enjoying wine has enhanced the wine drinking experience. Furthermore, these same individuals enjoy a lifestyle of various outdoor activities such as outdoor concerts in the park, a backyard picnic on the lawn, or watching the sunset on the beach. These activities are enriched by the ability to enjoy a glass a wine and snacks with family and friends. This has led to more and more people taking the tasting room experience "on the road" to these, and other, venues.

The problem with trying to take the tasting room experience "on the go" is oftentimes the hassle of transporting not only the wine and snacks, but also a separate table and platter on which to display and serve the same. Not to mention keeping track of a wine key to open the bottles. In order to truly mimic the tasting room experience at these outdoor locations, a consumer has to pack and transport separate bulky tables and trays capable of holding your wine bottles and drinking glasses, and displaying your culinary options, and carrying and keeping track of a wine key in a separate pocket or pouch in order to uncork your favorite bottle of wine. This invention solves the above-mentioned problems by combining a bi-level portable table with collapsible, locking legs, a serving tray that rests on top of the table which organizes and displays your food options and doubles as a wine bottle holder, notches to hold four wine glasses, and a magnetic underside to secure and provide easy access to a wine key. When not in use, the entire apparatus folds up, is held together with a Velcro strap, and is portable via handle cut-outs from either end. With this invention, transporting and setting up a tasting experience on the go is simplified. Furthermore, with this invention, the wine key never goes missing because it is magnetically attached to the apparatus. Additionally, this apparatus makes an excellent and attractive centerpiece for entertaining. The wine nook truly enhances the wine drinking experience.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

BRIEF SUMMARY OF THE INVENTION

This invention is a collapsible, transportable table apparatus that allows for the enjoyment of wine and snacks at various locations.

Namely, this apparatus comprises:
a bi-level table having a top base and a bottom base with four collapsible legs that fold down in a singular fashion at four attached hinges which are affixed to the underside of the top base;
at least one pin locking mechanism to hold the collapsible legs in the upright position when in use, located on at least one of the attached leg hinges;
said bi-level table having a bottom base, proportionately smaller in size than said top base, held in place and connected to the top base by the four collapsible legs at four opposing corner locations and to the bottom base at four opposing locations on the outer vertical rim of the bottom base;
each of the four collapsible legs extend beyond the bottom base in equal distance and flare out at the end;
carved-out handles on opposite ends of the top base;
at least one notch carved into the top base at/near each corner to support and hold a glass stem;
a separate serving tray with carved-out sections to present and hold cheese and other snacks which sits flat on the upper face of the top base when the apparatus is in use;
at least one circular hole carved into the top base, as well as at least one hole carved into the separate serving tray, that when aligned with each other hold at least one bottle of wine in place and support the serving tray upon the top base;
at least one magnet imbedded into the underside of the bottom base for safekeeping of a wine key or other metal utensils;
at least one circular, corked-lined inlay on the upper face of the bottom base to hold the at least one bottle of wine in place; and
an elastic Velcro strap for holding the separate tray and collapsed table together to allow for easy storage and transport when the apparatus is not in use.

The top base and the bottom base are spaced proportionately from each other and held in the same fixed location by the four equally-sized legs, which are made of a durable metal material, and held in place when the pin-locking mechanism, which is located on one of the four leg hinges at the underside of the top base, is engaged. The head of the pin-locking mechanism is circular in shape and is larger than the rest of the pin to allow for ease of use. The pin is locked and engaged unless activated by the user by pulling it. When the pin is pulled, to begin the process of collapsing the bi-level table, the user folds all four hinged legs in one motion. When fully-collapsed, the underside of the top base and the upper face of the bottom base are touching.

When set up, and when collapsed, the handles carved into opposite ends of the top base are fully accessible. The two half-moon-shaped carved-out handles are equal in size and large enough for an adult hand to fit into each end. The at least one glass stem notch is preferably four glass stem notches. However, one skilled in the art will recognize that any number of notches may be anticipated. The glass stem notches are located on inside of each end of each handle. When there are four glass stem notches, there are two glass stem notches on each side of the top base. The glass stem notches are just wider than the stem of a wine glass to allow for the glass to slip through and are rounded at the inside end of the notch where the glass bowl portion of the wine glass rests upon the upper face of the top base. It is preferable that the notches extend at least one inch into the top base, but one skilled in the art will recognize that notch size and length can vary and other sizes are anticipated, and the rounded inside end is slightly wider than the elongated portion of the notch.

The at least one inlay carved into the upper face of the bottom base extends into the upper face of the bottom base to ensure that the bottle set therein is stabilized. It is preferred that the inlay extend at least two millimeters into the upper face, but one skilled in the art will recognize that other distances may be anticipated. Each inlay is large enough to hold one bottle in place, and is known to be compatible with bottles up to 3.53 inches in diameter.

Whereas the top base and bottom base are in generally in the shape of an elongated oval, the serving tray is shaped in a rounded geometric manner. A preferable shape would be similar to a butterfly but one skilled in the art will recognize that other shapes are equally anticipated. The serving tray is similar in thickness and material to the top base. The underside of the serving tray is smooth, and the upper face of the serving tray has at least two separate compartments carved into it for separating, presenting, and serving desired treats and snacks to complement the wine drinking experience. The serving tray has at least one circular hole carved into it. The at least one circular hole carved into the serving tray is the same size as the at least one circular hole carved into the top base of the bi-level table.

To use this invention, a user transports the apparatus to the desired location, selects an area to set up, unclasps and removes the Velcro strap that holds the collapsible, bi-level table and tray together during transport, places the apparatus face down on a smooth surface, releases the collapsed legs and straightens the legs until they are perpendicular to the top base in an upright position and locks the legs in place with the pin lock. After the legs are extended and locked into place, the user flips the apparatus face up, planting the four legs on a firm, level surface, and places the separate serving tray on the upper face of the top base, aligning the at least one carved-out circular hole in the top base with the at least one carved-out circular hole of the serving tray. The at least one bottle of wine is placed through the at least one aligned hole in the top base and the serving tray and hold the serving tray in place on the upper face of the top base of the bi-level table apparatus. The bottom of the wine bottle rest upon the upper face of the bottom base within the circular, cork-lined inlay. Additional items, such as cheeses or other snacks are displayed in the carved-out sections of the serving tray and the at least one notch located near each of the corners of the top base hold a glass of wine in either the full or empty state.

When done using the apparatus, remove the separate serving tray, turn the bi-level table up-side-down resting its upper face on a clean surface, and collapsing the bi-level table by pulling the locking pin, and shifting the bottom base into the top base by moving the bottom base to the right, which rotates the four hinges down until the top face of the bottom base is flush with the underside of the top base. Once collapsed, the bi-level table and the serving tray are connected with the Velcro strap for easing transport and storage.

BRIEF DESCRIPTION OF THE SEVERAL VIEWS OF THE DRAWINGS

Possible and preferred features of the present invention will now be described with particular reference to the accompanying drawings. However, it is to be understood that the features illustrated in and described with reference to the drawings are not to be construed as limiting on the broad scope of the invention. In the drawings:

FIG. 2 depicts a view from above the two-bottle version of the apparatus looking down onto the upper face of the top base, without the serving tray.

FIG. 3 depicts a front view of the set-up ready-to-use two-bottle version of the apparatus without the serving tray.

FIG. 4 depicts a side view of the set-up ready-to-use two-bottle version of the apparatus without the serving tray.

FIG. 5 depicts an above angled view of the set-up ready-to-use two-bottle version of the apparatus without the serving tray.

FIG. 6 depicts a view from above the two-bottle version of the serving tray with two serving compartments.

FIG. 7 depicts a side view of the two-bottle version of the serving tray with two serving compartments.

FIG. 8 depicts an above angled view of the two-bottle version of the serving tray with two serving compartments.

FIG. 14 depicts a view from above the one-bottle version of the serving tray with four serving compartments.

FIG. 15 depicts a side view of the one-bottle version of the serving tray with four serving compartments.

FIG. 16 depicts an above angled view of the one-bottle version of the serving tray with four serving compartments.

DETAILED DESCRIPTION OF THE INVENTION

Figure 1:
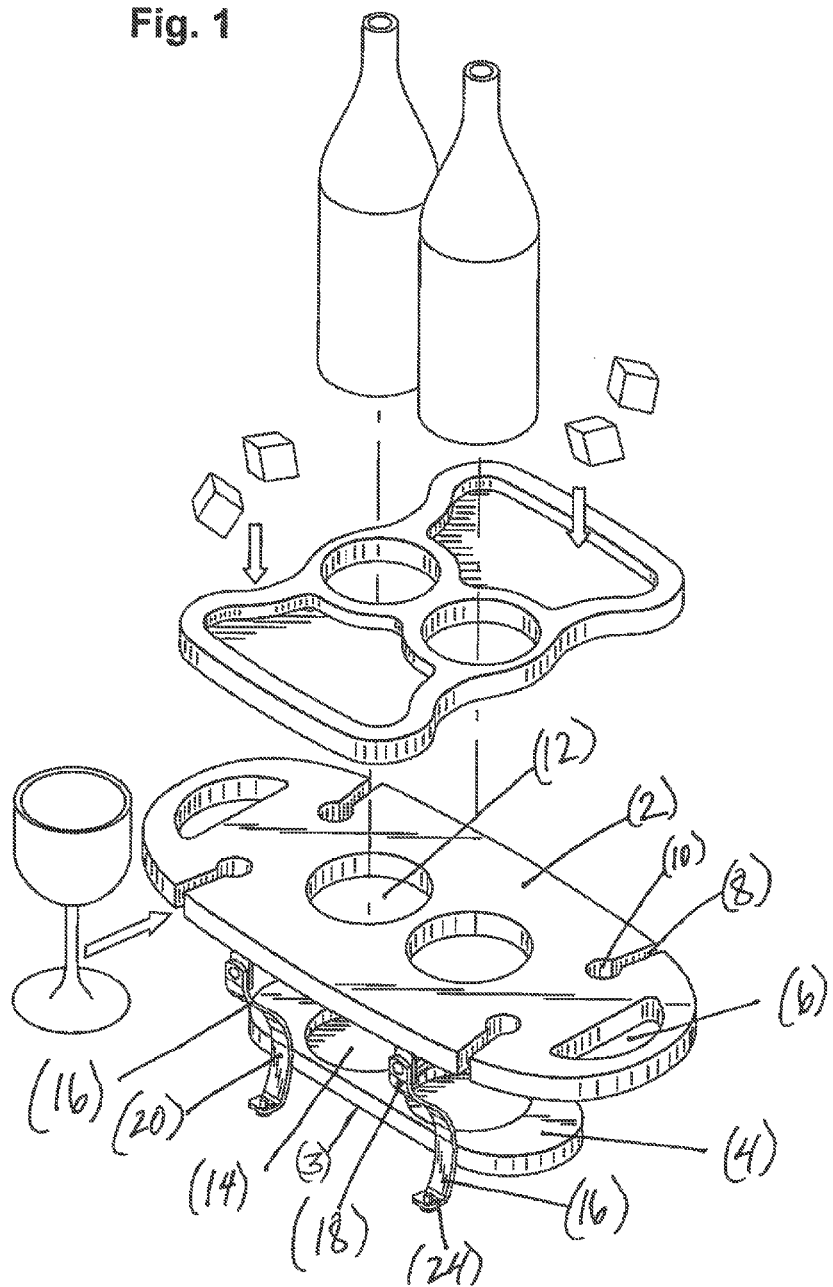
FIG. 1 depicts the two-bottle version of the complete apparatus when set-up and ready to be used and accept the serving tray; it is illustrated with one of the circular bottle holes in use, one of the glass stem notches in use, and both of the serving tray compartments in use.
Figure 9:
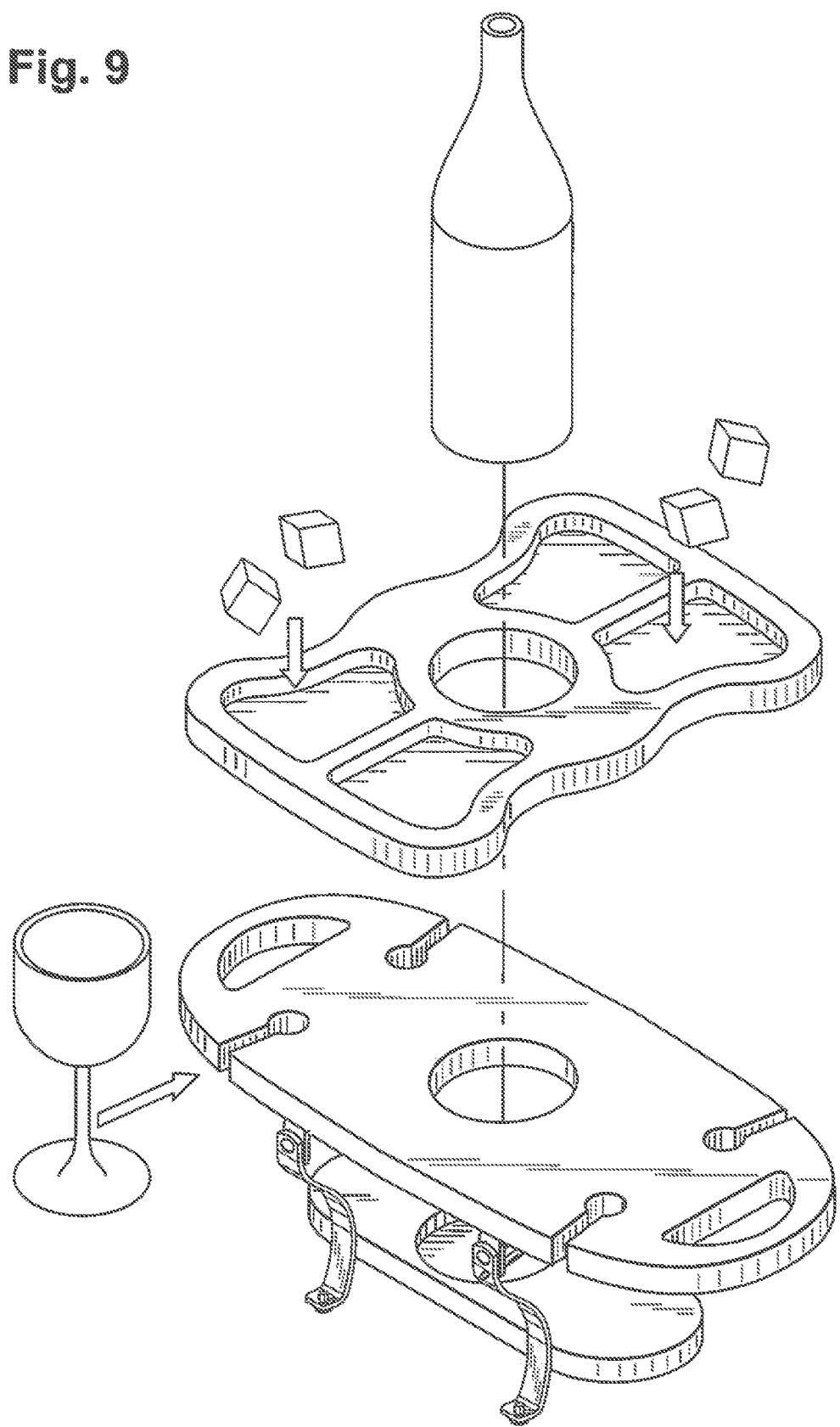
FIG. 9 depicts the one-bottle version of the complete apparatus when set-up and ready to be used; it is illustrated with the circular bottle hole in use, one of the glass stem notches in use, and one of the serving tray compartments in use.
Figure 10:
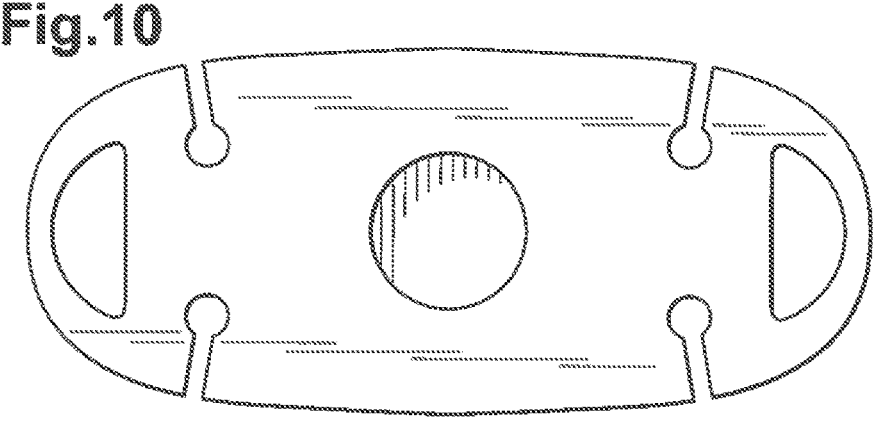
FIG. 10 depicts a view from above the one-bottle version of the apparatus looking down onto the upper face of the top base, without the serving tray.
Figure 11:
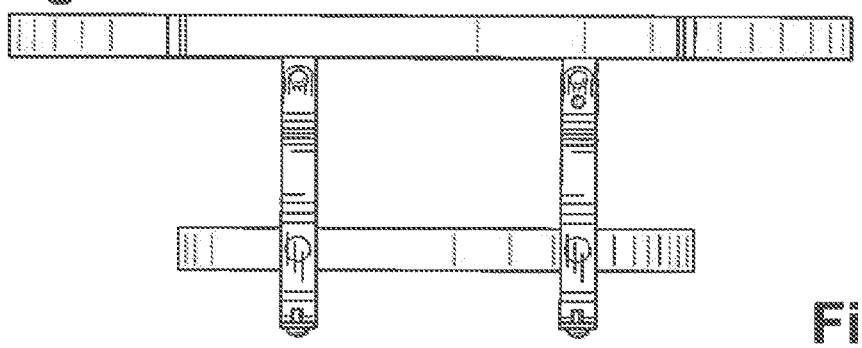
FIG. 11 depicts a front view of the set-up ready-to-use one-bottle version of the apparatus without the serving tray.
Figure 12:
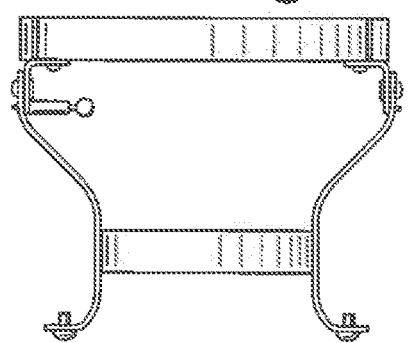
FIG. 12 depicts a side view of the set-up ready-to-use one-bottle version of the apparatus without the serving tray.
Figure 13:
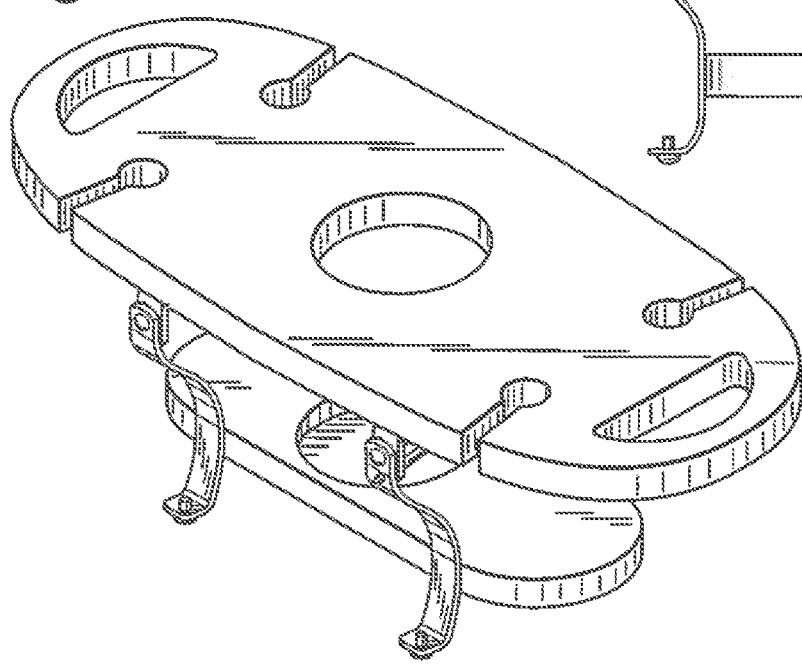
FIG. 13 depicts an above angled view of the set-up ready-to-use one-bottle version of the apparatus without the serving tray.

Turning now to the figures, FIG. 1 depicts the apparatus when it is set-up and ready to accept two bottles of wine and four stem glasses. The apparatus consists of a top base (2) and bottom base (4). The top base (2) is an elongated oval shape, with half-moon-shaped cut-outs (6) located at each end for use as handles. The bottom base (4) is also oval shaped, proportionately-similar, yet smaller in overall size, to the top base (2). The top base (2) and bottom base (4) are of equal thickness, and each has an exposed upper face and an exposed underside. Four equally-sized notches (8) are carved into the top base (2), one located near each of the four corners of the top base (2). The notches (8) allow for a glass stem to be slid into the top base and rest at the exaggerated circular end (10) of each notch (8). At least one circular cutout (12) is centered through the top base, each large enough to accept one bottle of wine. At least one cork-lined inlay (14) is carved into the upper face of the bottom base (4) to hold and stabilize the bottom of one wine bottle. While the preferred lining of the inlay is cork, on skilled in the art will recognize that other materials are equally anticipated.

The top base (2) is connected to the bottom base (4) via a four interconnected, collapsible metal legs (16). The four collapsible metal legs (16) are uniformly curved in shape and each hinge to the underside of the top base (2), with one leg hinge equipped with a pin-locking mechanism (18), and are each attached to the outside of the bottom base (4) at four opposing locations along the vertical outer edge of the bottom base (4) by four pivot hinges (20) and lay flush with the vertical outer edge of the bottom base (4). The bottom portion of each leg (16) extends a uniform distance beyond the underside of the bottom base (4) and each flares outward to create a flat foot (24) upon which the apparatus rests when set up for use.

Embedded within the underside of the bottom base (4) is at least one magnet (3) that can hold a wine key for safekeeping when not being used to open a bottle of your favorite wine.

FIG. 2 depicts a top view of the two-bottle version of the apparatus, without the serving tray, showing the upper face of the top base (2), the four glass stem notches (8), the two handles (6), two circular cutouts (12), and four circular glass stem notch ends (10).

FIG. 3 depicts the location where two of the four legs (16) contact the underside of the top base (2) and the vertical outer edge of the bottom base (4), and the location of the pivot hinges (20) which connect the four legs (16) to the bottom base (4).

FIG. 3 further depicts the location of the pin locking mechanism (18) and the embedded magnet (3).

FIG. 4 depicts the difference in size between the top base (2) and the bottom base (4), the shape of the metal legs (16), the location and shape of the pin locking mechanism (18), and the distance that the lower portion of the legs (16) extends beyond the underside of the bottom base (4).

FIG. 5 depicts the alignment and orientation between the top base (2), bottom base (4), the circular cut-outs (12) in the top base (2), the inlays (14) in the bottom base (4), and the pin locking mechanism (18).

FIGS. 6 and 8 depict the two-bottle version of the serving tray (26) that rests upon the exposed upper face of the top base when the apparatus is in use. The two-bottle serving tray (26) as depicted in FIGS. 6 and 8 contains two equally-sized, circular cut-outs (12) through which bottles of wine are placed, and two serving compartments (28) to display and serve snacks. FIG. 7 depicts a side view of the two-bottle serving tray showing its vertical outer edge (30).

FIGS. 9 through 16 depict the one-bottle version of the same apparatus, having the same features contained in FIGS. 1 through 8.

FIGS. 14 and 16 depict the one-bottle version of the serving tray (32) that rests upon the exposed upper face of the top base when the apparatus is in use. The one-bottle serving tray (32) as depicted in FIGS. 14 and 16 contains one circular cut-out (12) through which a bottle of wine is placed, and four serving compartments (28) to display and serve snacks desired snacks. FIG. 15 depicts a side view of the one-bottle serving tray showing its vertical outer edge (34).

While the figures depict a one-bottle and two-bottle version of the apparatus, one skilled in the art will recognize that multiple bottle versions are anticipated.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

What is claimed is:

1. A bi-level collapsible table apparatus comprising:
   a top base and a bottom base, each having an upper face and an underside, connected by four collapsible interconnected legs which are hinged to the underside of the top base and the outer vertical edges of the bottom base and lock into place with a single pin-locking mechanism located on one of the four collapsible legs mounted to the underside of the top base, at least one circular cutout in the top base, at least one circular inlay in the upper face of the bottom base, four notches carved into the top base, and two half-moon-shaped handles carved into the two opposite elongated ends of the top base.

2. The table apparatus of claim 1 wherein the top base and the bottom base are each in the shape of an elongated oval.

3. The table apparatus of claim 1 wherein the at least one circular inlay in the upper face of the bottom base is aligned with the at least one circular cutout of the top base.

4. The table apparatus of claim 1 where there is more than one circular inlay in the upper face of the bottom base and more than one circular cutout in the top base.

5. The table apparatus of claim 1 further comprising at least one magnet embedded within the underside of the bottom base at its center.

6. A bi-level collapsible table apparatus comprising:
   a top base and a bottom base, each having an upper face and an underside, connected by four collapsible interconnected legs which are hinged to the underside of the top base and the outer vertical edges of the bottom base and lock into place with a single pin-locking mechanism located on one of the four collapsible legs mounted to the underside of the top base, at least one circular cutout in the top base, at least one circular inlay in the upper face of the bottom base, four notches carved into the top base, and two half-moon-shaped handles carved into opposite elongated ends of the top base;
   and a detached serving tray of the same material of the top base and bottom base, said serving tray having an upper face and an underside and at least one circular cutout centered and proportionately spaced and having at least two serving compartments carved into the upper face of the serving tray.

7. The method of setting up a bi-level collapsible table apparatus comprising:
   a top base and a bottom base, each having an upper face and an underside, connected by four collapsible interconnected legs which are hinged to the underside of the top base and the outer vertical edges of the bottom base and lock into place with a single pin-locking mechanism located on one of the four collapsible legs mounted to the underside of the top base, at least one circular cutout in the top base, at least one circular inlay in the upper face of the bottom base, four notches carved into the top base, and two half-moon-shaped handles carved into opposite elongated ends of the top base; and a serving tray comprising the steps of: transporting the apparatus to the desired location, selecting an area to set up, placing the apparatus face down on a smooth surface, releasing the collapsed legs by pulling the pin-locking mechanism, and straightening the legs until they are perpendicular to the top base in an upright position and releasing the pin locking mechanism to lock the legs in place with the pin lock, flipping the apparatus face up, planting the four legs on a firm, level surface, and placing the separate serving tray on the upper face of the top base, aligning the at least one circular cutout in the top base with the at least one circular cutout of the serving tray.

\* \* \* \* \*